April 7, 1942.    E. JOHNSON    2,279,139
FISH SCALER AND SCRAPER
Filed Aug. 1, 1940
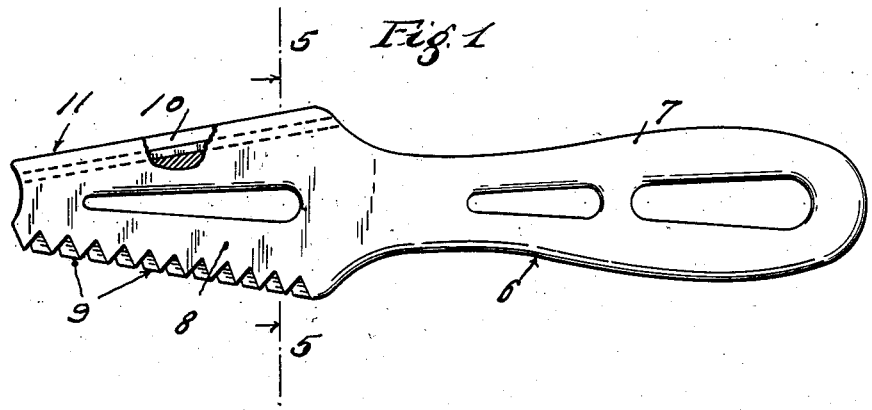
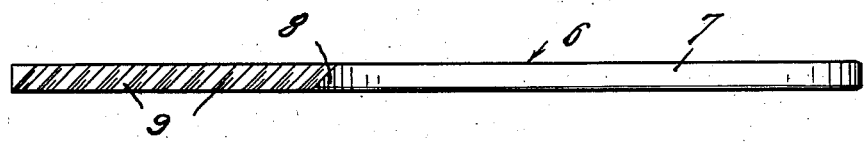
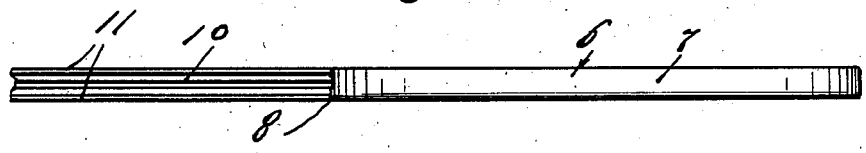
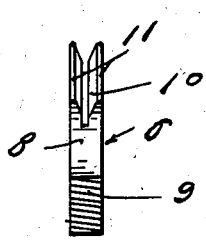
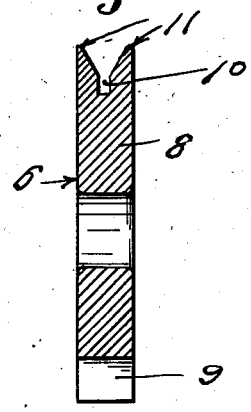
INVENTOR
Edward Johnson
By his Attorney
Harry D. Kilgore Patented Apr. 7, 1942

2,279,139

UNITED STATES PATENT OFFICE 2,279,139

FISH SCALER AND SCRAPER

Edward Johnson, Preston, Minn.

Application August 1, 1940, Serial No. 349,154

1 Claim. (Cl. 17—7)

My invention has for its object to provide an extremely simple and highly efficient fish scaler and scraper.

To the above end, the invention consists of the novel construction and arrangement of parts hereinafter described and defined in the claim.

In the accompanying drawing which illustrates the invention, like characters indicate like parts throughout the several views.

Referring to the drawing:

Fig. 1 is a side elevation of the fish scaler and scraper with a portion thereof broken away and the underlying part sectioned;

Fig. 2 is an elevation of the toothed edge of the same;

Fig. 3 is an elevation of the scraper edge of the invention;

Fig. 4 is a front end elevation of the invention; and

Fig. 5 is a view in transverse vertical section taken on the line 5—5 of Fig. 1, on an enlarged scale.

The improved fish scaler and scraper, as shown, is made of a single flat metal bar 6 that is relatively thin. One end portion of the bar 6 is shaped to afford a convenient handle 7 and the other end portion thereof affords a body member 8. The longitudinal edges of the body member 8 are outwardly tapered from the handle 7. Said body member 8 is blunt and concave between the tapered longitudinal edges thereof.

In one of the longitudinal edges of the body member 8 are relative coarse teeth 9 that extend transversely oblique and the full length of said body member. A groove 10 is formed in the other edge of the body member 8 and extends the full length of said body. As shown, the bottom portion of the groove 10 is relatively narrow and the sides thereof are parallel. From the bottom portion of the groove 10, the sides thereof are in upwardly flaring relation. These upwardly flaring sides of the groove 10 terminate substantially at the sides of the body member 8 at the outer edges thereof. The outer edges of the body member 8 afford relatively sharp longitudinal scraping edges 11 that extend the full length of the body member 8.

It is important to note that the ends of the groove 10 are open. The purpose of the teeth 9 is, of course, to remove the scale from a fish and the scraping edges 11 are for use in scraping the body of the fish, after the scales are removed, to remove from said body loose scales, liquid and any other loose or foreign matter. The open ends of the groove 10 and the outwardly diverging side walls thereof make said groove substantially self-cleaning, so that any scale and other matter remaining in said groove may be easily removed.

It will, of course, be understood that the transverse contour of the groove 10 may be varied from that shown.

During the scaling of a fish, the device may be easily and quickly turned in the hand holding the same without letting go thereof to bring the teeth 9 into scale-removing position on the fish or the longitudinal scraping edges 11 into scraping position on the fish.

The construction and arrangement of parts of the improved fish scaler and scraper make it extremely easy to keep the same in a clean and sanitary condition, simply by letting water run thereon or by working the same back and forth in a body of water.

The outwardly converging relation of the row of teeth 9 and the scraping edge 11, when either thereof is placed in an operative position on the body of a fish, brings the handle 8 into a convenient position for the hand holding the same while manipulating the device.

The drawing illustrates a commercial form of the invention, but it will be understood that the same is capable of certain modifications as to details of construction and arrangement of parts within the scope of the invention herein disclosed.

What I claim is:

A device of the kind described having a wide body that is relatively thin and having at one end a handle, the longitudinal outer edges of the body being in outwardly converging relation, one of said longitudinal edges having therein a plurality of transversely oblique teeth, the edges of the teeth being relatively sharp and the gullets therebetween being V-shape in cross-section, the other of said longitudinal edges having therein a groove that extends lengthwise thereof and that is V-shape in cross-section, the edges of the body at the sides of said groove being relatively sharp and extending substantially the full length of the body.

EDWARD JOHNSON.